United States Patent
Lu et al.

(10) Patent No.: US 12,260,655 B2
(45) Date of Patent: Mar. 25, 2025

(54) METHOD FOR DETECTION OF THREE-DIMENSIONAL OBJECTS AND ELECTRONIC DEVICE

(71) Applicant: HON HAI PRECISION INDUSTRY CO., LTD., New Taipei (TW)

(72) Inventors: Chih-Te Lu, New Taipei (TW); Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 377 days.

(21) Appl. No.: 17/854,301

(22) Filed: Jun. 30, 2022

(65) Prior Publication Data

US 2023/0386230 A1 Nov. 30, 2023

(30) Foreign Application Priority Data

May 31, 2022 (CN) .......................... 202210616195.7

(51) Int. Cl.
*G06V 20/64* (2022.01)
*G06T 7/70* (2017.01)
*G06V 20/58* (2022.01)

(52) U.S. Cl.
CPC ................ *G06V 20/64* (2022.01); *G06T 7/70* (2017.01); *G06V 20/58* (2022.01); *G06T 2200/04* (2013.01)

(58) Field of Classification Search
CPC ......... G06T 2200/04; G06T 7/70; G06T 7/73; G06T 7/75; G06T 2207/20081;
(Continued)

(56) References Cited

U.S. PATENT DOCUMENTS

2012/0314030 A1* 12/2012 Datta ........................ G06T 7/20
348/44
2019/0026917 A1* 1/2019 Liao ....................... G06V 10/82
(Continued)

FOREIGN PATENT DOCUMENTS

CN 114078246 2/2022
CN 114495038 5/2022

OTHER PUBLICATIONS

Yi, Jingru, Pengxiang Wu, and Dimitris N. Metaxas. "ASSD: Attentive single shot multibox detector." Computer Vision and Image Understanding 189 (2019): 102827. (Year: 2019).*
(Continued)

*Primary Examiner* — Andrae S Allison
*Assistant Examiner* — Emmanuel Silva-Avina
(74) *Attorney, Agent, or Firm* — ScienBiziP, P.C.

(57) ABSTRACT

A method for detection of three-dimensional (3D) objects on or around a roadway by machine learning, applied in an electronic device, obtains images of road, inputs the images into a trained object detection model, and determines categories of objects in the images, two-dimensional (2D) bounding boxes of the objects, and parallax (rotation) angles of the objects. The electronic device determines object models and 3D bounding boxes of the object models and determines distance from the camera to the object models according to size of the 2D bounding boxes, image information of the detection images, and focal length of the camera. The positions of the object models in a 3D space can be determined according to the rotation angles, the distance, and the 3D bounding boxes, and the positions of the object models are taken as the position of the objects in the 3D space.

18 Claims, 5 Drawing Sheets

(58) Field of Classification Search
CPC .......... G06T 2207/30252; G06V 20/58; G06V 20/64; G06V 20/647
USPC ........................................................ 382/103
See application file for complete search history.

(56) References Cited

U.S. PATENT DOCUMENTS

| | | | |
|---|---|---|---|
| 2021/0209797 A1* | 7/2021 | Lee | G06T 17/00 |
| 2021/0374988 A1* | 12/2021 | Meier | G06T 7/536 |
| 2022/0026917 A1* | 1/2022 | Beijbom | G05D 1/0219 |
| 2023/0230257 A1* | 7/2023 | Fay | G06T 7/60 |
| | | | 382/103 |

OTHER PUBLICATIONS

Liu, Wei, et al. "Ssd: Single shot multibox detector." Computer Vision-ECCV 2016: 14th European Conference, Amsterdam, The Netherlands, Oct. 11-14, 2016, Proceedings, Part I 14. Springer International Publishing, 2016. (Year: 2016).*

Limaye, Aniket, et al. "SS3D: Single shot 3D object detector." arXiv preprint arXiv:2004.14674 (2020). (Year: 2020).*

Guo, Lie, et al. "Accurate and fast single shot multibox detector." IET Computer Vision 14.6 (2020): 391-398. (Year: 2020).*

* cited by examiner

METHOD FOR DETECTION OF THREE-DIMENSIONAL OBJECTS AND ELECTRONIC DEVICE

This application claims priority to Chinese Patent Application No. 202210616195.7 filed on May 31, 2022, in China National Intellectual Property Administration, the contents of which are incorporated by reference herein.

FIELD

The subject matter herein generally relates to machine learning, in particular, relates to a method for real-time detection of three-dimensional (3D) objects on a road and an electronic device.

BACKGROUND

In a field of autonomous driving, an autonomous driving system uses different types of sensors to detect objects in front of or near a vehicle and make driving decisions. Therefore, the automatic driving system needs to quickly and accurately detect the types and the position of the objects to ensure driving safety. At present, most 3D object detection algorithms use regression operation to obtain the 3D position of the objects. However, the regression operation causes the 3D object detection algorithm to spend a long time in prediction. In addition, most of current 3D target detection algorithms also need to accurately detect the distance between the vehicle and the objects in front of the vehicle. In the current 3D target detection algorithms, LIDAR or RADAR are often used to obtain depth information, but cost is high and the field of view of LIDAR and RADAR devices is relatively narrow.

BRIEF DESCRIPTION OF THE DRAWINGS

Implementations of the present disclosure will now be described, by way of embodiment, with reference to the attached figures.

DETAILED DESCRIPTION

Figure 1:
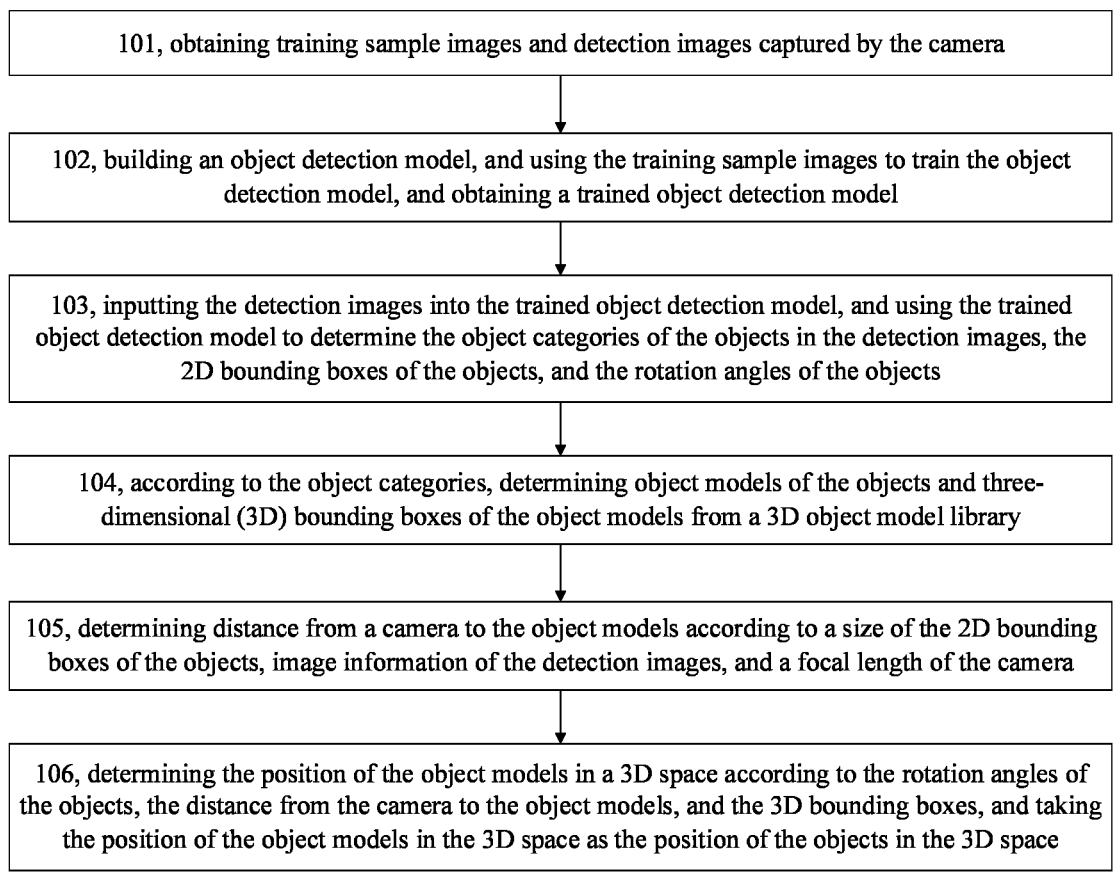
FIG. 1 is a flowchart of one embodiment of a method for detection of three-dimensional objects.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

In a field of autonomous driving, the autonomous driving system can decisions according to information detected by different sensors detecting objects in front of or near a vehicle. Therefore, the automatic driving system needs to quickly and accurately detect object categories and position of the objects to ensure driving safety. At present, most 3D object detection algorithms perform regression operation on the object categories and the position of the objects to obtain a 3D representation of the objects. However, the regression operation causes the 3D object detection algorithm to spend a long time in prediction processing. In addition, when detecting a distance between the vehicle and the objects in front of the vehicle, the current 3D target detection algorithm uses LIDAR or RADAR to obtain depth information, but the cost of such devices is high and the field of view is relatively narrow.

Based on the above problems, the embodiments of the present application provide a method for detection of three-dimensional objects. The method does not use regression operations, and can quickly obtain the object categories and the 3D position of the objects, and other devices are not needed to obtain depth information when obtaining the distance between the vehicle and the objects in front of the vehicle, reducing costs. The method for detection of 3D objects will be described in detail below.

FIG. 1 illustrates the method for detection of three-dimensional objects. The method is applied in an electronic device (referring to FIG. 5). The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method for detection of 3D objects is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed.

Additional blocks may be added or fewer blocks may be utilized without departing from this disclosure. The example method can begin at block 101.

At block 101, obtaining training sample images and detection images captured by the camera.

In one embodiment, the training sample images include, but are not limited to, various scenarios on urban roads and rural roads in different time periods. In one embodiment, the detection images include, but are not limited to, images of scenes on urban and rural roads in different time periods, captured by a monocular camera. It should be noted that although the training sample images and the detection images captured by the monocular camera are both urban and rural scene images in different time periods, the training sample images and the detection images are not same.

In one embodiment, obtaining the training sample images includes: performing data enhancement operations on the training sample images and obtaining further and different training sample images. In one embodiment, the data enhancement operations include, but are not limited to, flipping images, rotating images, scaling images, cropping images. By the data enhancement operation, the training sample images can be effectively expanded, and an object detection model can be trained and optimized by using more training sample images in different scenarios, making the object detection model more reliable and robust.

At block 102, building an object detection model, and using the training sample images to train the object detection model, and obtaining a trained object detection model.

In one embodiment, building the object detection model includes: improving the object detection model based on a Single Shot MultiBox Detector (SSD) network, and the SSD network includes a backbone network and a first head network. In one embodiment, improving the object detection model based on the SSD network includes: adding a second head network after the backbone network in the SSD network. After improving the object detection model, the object detection model includes the backbone network, the first head network, and the second head network.

In one embodiment, using the training sample images to train the object detection model and obtaining the trained object detection model includes: using the backbone network in the object detection model to perform feature extraction on the training sample images, and obtaining training feature maps of different scales of the training sample images; generating first default boxes on the training feature maps of different scales, and inputting each of the training feature maps of different scales into the first head network for a convolution operation, outputting scores of the object categories of the objects in the first default boxes, and outputting positions of the first default boxes; performing a non-maximum suppression operation on the first default boxes, and outputting two-dimensional (2D) bounding boxes of the objects in the training sample images, and the 2D bounding boxes of the objects in the training sample images includes the object categories in the 2D bounding boxes and the positions of the 2D bounding boxes; inputting the training feature maps of each different scale into the second head network for convolution operation, and outputting rotation angles of the objects in the training sample images as if obtaining a parallax; minimizing a first loss value of the first head network and a second loss value of the second head network, and obtaining the trained object detection model.

In one embodiment, the first head network includes convolutional layers. In one embodiment, the second head network includes convolutional layers and fully connected layers. The method further includes: inputting the training feature maps of different scales into the convolutional layers of the second head network for performing convolution operation, outputting rotation angles of the objects in the training sample images by the fully connected layers.

In one embodiment, a loss function of the SSD network is used as the loss function of the first head network, and the loss function of the SSD network is known in prior art, which will not be repeated in this application.

In one embodiment, the loss function of the second head network is:

LOSS=$\Sigma_{i=1}^{n}|Y_i-f(x_i)|$, where, LOSS is the loss function of the second head network, Y_i represents the values of the rotation angles of the objects output by the second head network, and f(x_i) represents the actual value of the rotation angles of the objects.

In one embodiment, the method includes: using the loss function of the first head network and the loss function of the second head network to train the object detection model, and performing iterative training until the object detection model converges and a minimized loss value is obtained, and thereby obtaining the trained object detection model.

Figure 2:
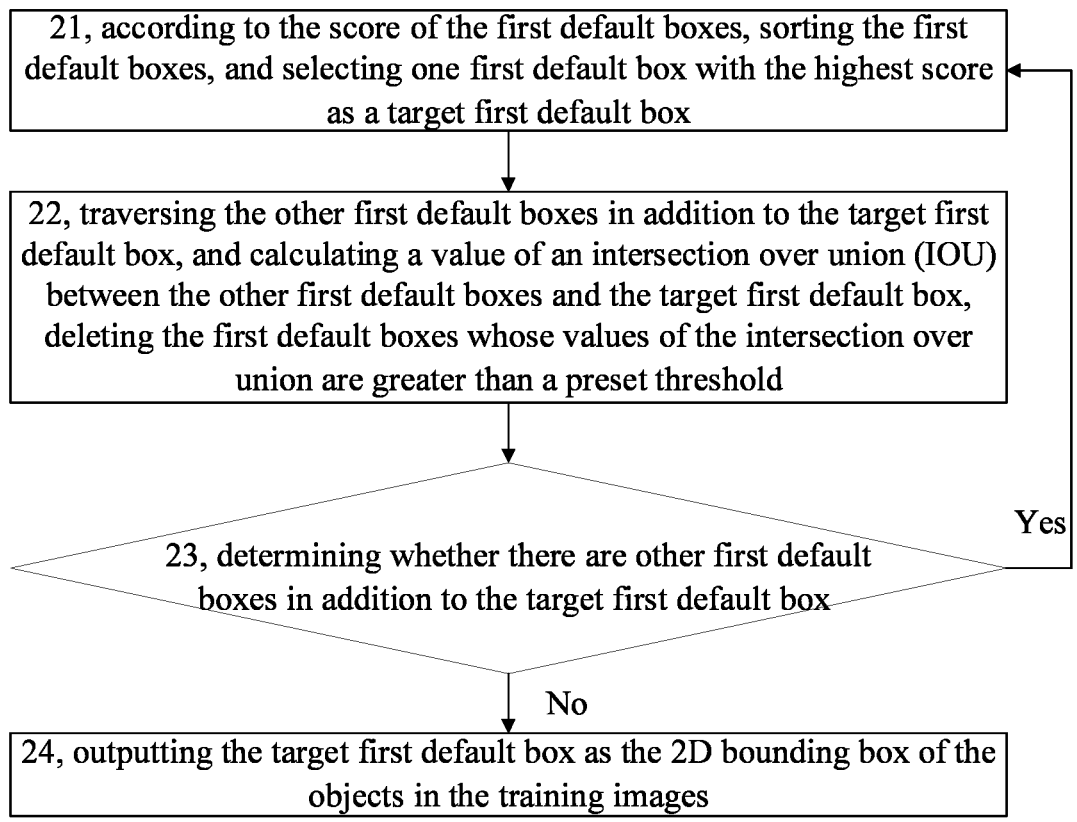
FIG. 2 is a flowchart of one embodiment of a Non-Maximum Suppression method.

The first default boxes have scores of the object categories of the objects in the first default boxes and positions of the default boxes. FIG. 2 illustrates a method for performing the non-maximum suppression operation on the first default boxes. The method for performing the non-maximum suppression operation includes blocks 21-23.

At block 21, according to the scores of the first default boxes, sorting the first default boxes, and selecting one first default box with the highest score as a target first default box.

At block 22, traversing the other first default boxes in addition to the target first default box, and calculating a value of an intersection over union (IoU) between the other first default boxes and the target first default box, deleting the first default boxes whose values of the IoU are greater than a preset threshold. In one embodiment, the IoU is a degree of overlap between the target first default box and other first default box.

At block 23, determining whether there are other first default boxes in addition to the target first default box. When there are other first default boxes, block 21 is executed, and when there are no other first default boxes, block 24 is executed.

At block 24, outputting the target first default box as the 2D bounding box of the objects in the training images.

At block 103, inputting the detection images into the trained object detection model, and using the trained object detection model to determine the object categories of the objects in the detection images, the 2D bounding boxes of the objects, and the rotation angles of the objects.

In one embodiment, the electronic device inputs the detection images into the trained object detection model, and extracts the features of the detection images by the backbone network to obtain the feature maps of different scales. The electronic device generates second default boxes on the feature maps of different scales, inputs each of the feature maps of different scales into the first head network for performing convolution operation, and outputs the scores of the object categories of the objects in the second default boxes and the positions of the second default boxes, performs the non-maximum suppression operation on the second default boxes, and outputs 2D bounding boxes of the objects in the detection images, where the 2D bounding boxes of the objects in the detection images include the object categories of objects in the 2D bounding boxes and the positions of the 2D bounding boxes. The electronic device inputs the feature maps of different scales into the second head network for performing convolution operation, and outputs the rotation angles of the objects in the detection images. Further, the electronic device inputs the detection images into the trained object detection model for processing, and outputs the object categories of the object in the detection images, the 2D bounding boxes of the objects, and the rotation angles of the objects.

At block 104, according to the object categories, determining object models of the objects and three-dimensional (3D) bounding boxes of the object models from a 3D object model library.

In one embodiment, the 3D object model library is pre-established, and the 3D object model library includes a number of the object models corresponding to different object categories, and the 3D bounding boxes of the object models. In one embodiment, each of the 3D bounding boxes includes length, width, and height of one object category corresponding to each of the 3D bounding boxes.

Figure 3:
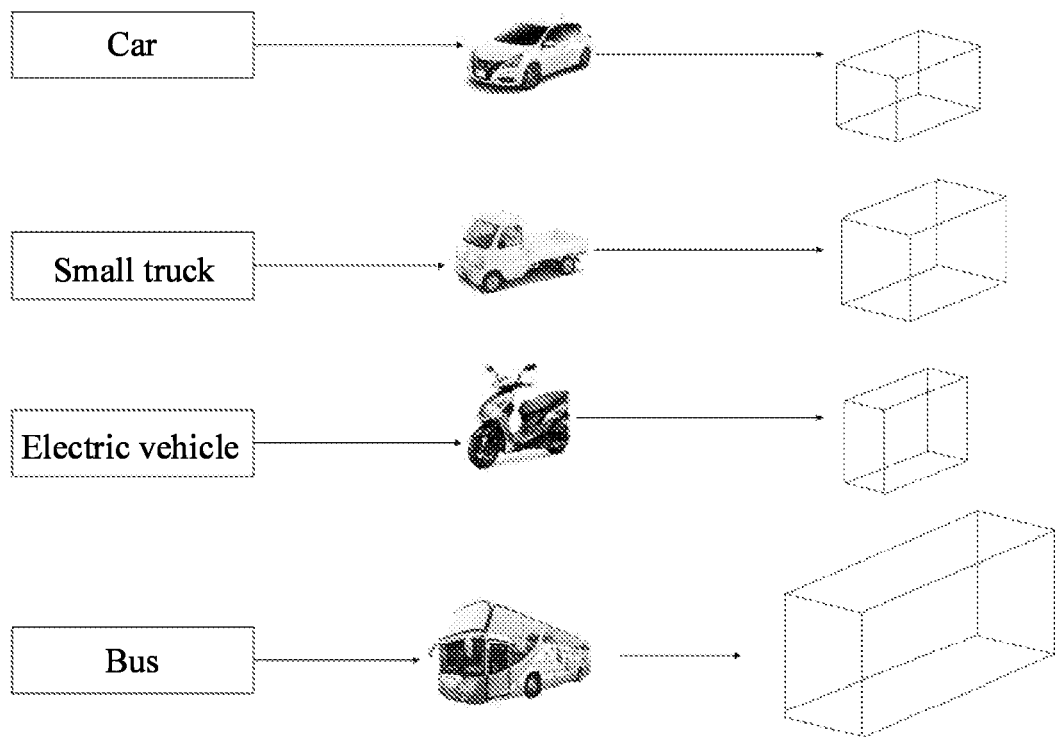
FIG. 3 is a schematic diagram of a 3D object model library used in the method of FIG. 1.

In one embodiment, the electronic device searches the 3D object model library according to the object categories to determine the object models, and determines the 3D bounding boxes of the object models according to the object models. FIG. 3 illustrates a schematic diagram showing 3D bounding boxes determined. When one object category is a car, the object model of the car is searched according to the 3D object model library, and the 3D bounding box of the car is searched according to the object model of the car. When the object category is a small truck, the object model of the small truck is searched according to the 3D object model library, and the 3D bounding box of the small truck is searched according to the object model of the small truck. When the object category is an electric vehicle, the object model of the electric vehicle is searched according to the 3D object model library, and the 3D bounding box of the electric vehicle is searched according to the object model of the electric vehicle. When the object category is a bus, the object model of the bus is searched according to the three-dimensional object model library, and the 3D bounding box of the bus is searched according to the object model of the bus. In one embodiment, the object model includes, but is not limited to, a 3D model.

At block 105, determining distance from a camera to the object models according to a size of the 2D bounding boxes of the objects, image information of the detection images, and a focal length of the camera.

In one embodiment, the size of the 2D bounding boxes of the objects includes the width and/or length of the 2D bounding boxes of the objects, and the image information of the detection images includes resolution of the detection images and a pixel width of the detection images.

Figure 4:
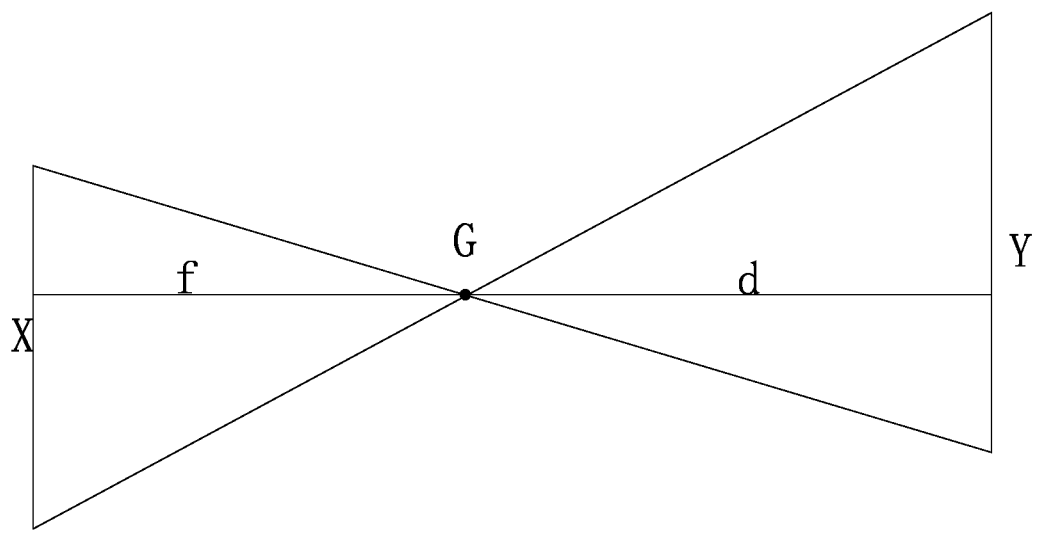
FIG. 4 is a schematic diagram showing distance from a camera to an object model calculated.

In one embodiment, the distance from the camera to the object models is calculated according to the width and/or the length of the 2D bounding boxes of the objects, the focal length of the camera, the resolution of the detection images, and the pixel width of the detection images. FIG. 4 illustrates the calculating of a distance from a camera to the object models. In FIG. 4, X represents the pixel width of the detection images, f represents the focal length of the camera, G represents the optical center of the camera, d represents the distance from the camera to the object models, and Y represents the width of the 2D bounding boxes. According to similar triangles principle, a first formula can be obtained as $$\frac{f}{d} = \frac{X}{Y},$$

and a second formula can be obtained as $$Y = \frac{X}{P},$$

where P represents the resolution of the detection images.

The distance from the camera to the object models can be obtained according to the first formula and the second formula.

At block 106, determining the position of the object models in a 3D space according to the rotation angles of the objects, the distance from the camera to the object models, and the 3D bounding boxes, and taking the position of the object models in the 3D space as the position of the objects in the 3D space.

In one embodiment, the rotation angles of the objects are used as the rotation angles of the object models.

In one embodiment, determining the position of the object models in a 3D space according to the rotation angles of the objects, the distance from the camera to the object models and the 3D bounding boxes includes: determining the direction of the object models in the 3D space according to the rotation angles of the object models; determining the positions of the object models in the 3D space according to the direction of the object models in the 3D space, the distance from the camera to the object models, and the 3D bounding boxes.

In one embodiment, the positions of the object models in the 3D space are taken as the positions of the objects in the 3D space, the object categories and the positions of the objects in the 3D space are output and displayed on a display screen.

The above embodiments are only specific embodiments of the present application, but a protection scope of the present application is not limited to these. For those of ordinary skill in the art, improvements can be made without departing from the inventive concept of the present application, but these all belong to the protection scope of the present application.

Figure 5:
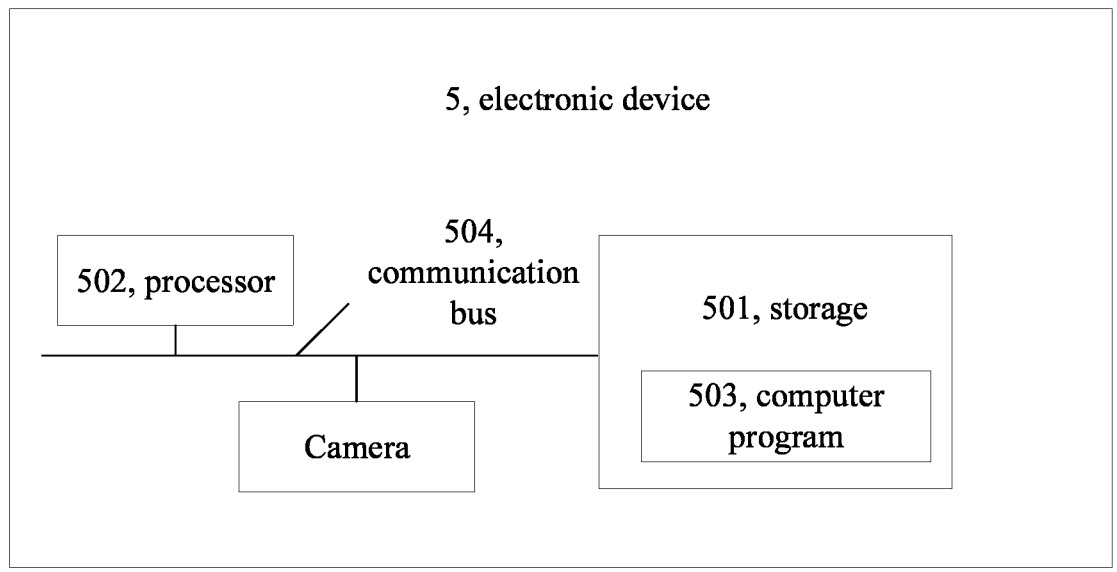
FIG. 5 is a schematic diagram of one embodiment of an electronic device.

FIG. 5 illustrates the electronic device 5. The electronic device 5 includes a storage 501, a processor 502, a computer program 503 stored in the storage 501, and at least one communication bus 504. In one embodiment, electronic device 5 can be an in-vehicle device. The in-vehicle device is provided on a vehicle, and the in-vehicle device may be an in-vehicle computer.

Those skilled in the art can understand that the schematic diagram shown in FIG. 5 is only an example of the electronic device 5, and does not constitute a limitation on the electronic device 5. Other examples may include more or less components than those shown in the drawings, or have different combinations of components, or different components, for example, the electronic device 5 may also include input and output devices, network access devices, and the like.

The at least one processor 502 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 502 can be a microprocessor or the at least one processor 502 can also be any conventional processor, etc. The at least one processor 502 is the control center of the electronic device 5, using various interfaces and lines to connect various parts of the entire electronic device 5.

The storage 501 can be used to store the computer program 503, and the at least one processor 502 implements the electronic program by executing the computer program 503 stored in the storage 501 and calling up the data stored in the storage 501. The storage 501 may include a stored program area and a stored data area, wherein the stored program area may store an operating system, an application program required for at least one function (such as a sound playback function, an image playback function, etc.), etc. The storage data area may store data (such as audio data) created according to the use of the electronic device 5, etc. In addition, the storage 501 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 5 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented as a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for detection of three-dimensional (3D) objects comprising:
   obtaining detection images by a camera;
   inputting the detection images into a trained object detection model, and determining object categories, two-dimensional (2D) bounding boxes and rotation angles of objects in the detection images by using the trained object detection model;
   according to the object categories, determining object models of the objects and 3D bounding boxes of the object models from a 3D object model library;
   determining a distance from the camera to the object models according to a size of the 2D bounding boxes of the objects, image information of the detection images, and a focal length of the camera, by: calculating the distance from the camera to the object models according to a width and/or a length of the 2D bounding boxes of the objects, the focal length of the camera, a resolution of the detection images, and a pixel width of the detection images;
   determining a position of the object models in a 3D space according to the rotation angles of the objects, the distance from the camera to the object models and the 3D bounding boxes, and taking the position of the object models in the 3D space as the position of the objects in the 3D space.

2. The method for detection of three-dimensional objects as claimed in claim 1, further comprising:
   building an object detection model;
   improving the object detection model based on a Single Shot MultiBox Detector (SSD) network, which comprises a backbone network and a first head network.

3. The method for detection of three-dimensional objects as claimed in claim 1, further comprising:
   adding a second head network after the backbone network in the SSD network, the object detection model comprising the backbone network, the first head network and the second head network.

4. The method for detection of three-dimensional objects as claimed in claim 3, further comprising:
   obtaining training sample images;
   performing a feature extraction on the training sample images by using the backbone network in the object detection model, and obtaining training feature maps of different scales of the training sample images;
   generating first default boxes on the training feature maps, performing a convolution operation by inputting the training feature maps into the first head network, outputting scores of the object categories of the objects in the first default boxes, and outputting positions of the first default boxes;
   performing a non-maximum suppression operation on the first default boxes, and outputting a 2D bounding boxes of the objects in the training sample images, the 2D bounding boxes of the objects in the training sample images comprising the object categories in the 2D bounding boxes and the position of the 2D bounding boxes;
   performing a convolution operation by inputting the training feature maps into the second head network, and outputting the rotation angles of the objects in the training sample images;
   minimizing a first loss value of the first head network and a second loss value of the second head network, and obtaining the trained object detection model.

5. The method for detection of three-dimensional objects as claimed in claim 3, further comprising:
   performing data enhancement operations on the training sample images.

6. The method for detection of three-dimensional objects as claimed in claim 5, wherein the data enhancement operations comprises flipping images, rotating images, scaling images, or cropping images.

7. The method for detection of three-dimensional objects as claimed in claim 1, further comprising:
   establishing a 3D object model library, which comprises a plurality of the object models of different object categories, and the 3D bounding boxes of the object models, each of the 3D bounding boxes comprise length, width and height of one object category of one 3D bounding boxes.

8. The method for detection of three-dimensional objects as claimed in claim 1, further comprising:
   determining the rotation angles of the objects as the rotation angles of the object models;
   determining a direction of the object models in the 3D space according to the rotation angles of the object models;
   determining the positions of the object models in the 3D space according to the direction of the object models in the 3D space, the distance from the camera to the object models, and the 3D bounding boxes.

9. The method for detection of three-dimensional objects as claimed in claim 1, further comprising:
   outputting the object categories and the positions of the objects in the 3D space;
   displaying the object categories and the positions of the objects on a display screen.

10. An electronic device comprising:
    a processor; and
    a non-transitory storage medium coupled to the processor and configured to store a plurality of instructions, which cause the processor to:
    obtain detection images by a camera;
    input the detection images into a trained object detection model, and determine object categories, two-dimensional (2D) bounding boxes and rotation angles of objects in the detection images by using the trained object detection model;
    according to the object categories, determine object models of the objects and 3D bounding boxes of the object models from a 3D object model library;
    determine a distance from the camera to the object models according to a size of the 2D bounding boxes of the objects, image information of the detection images, and a focal length of the camera, by: calculate the distance from the camera to the object models according to a width and/or a length of the 2D bounding boxes of the objects, the focal length of the camera, a resolution of the detection images, and a pixel width of the detection images;
    determine a position of the object models in a 3D space according to the rotation angles of the objects, the distance from the camera to the object models, and the 3D bounding boxes, and take the position of the object models in the 3D space as the position of the objects in the 3D space.

11. The electronic device as claimed in claim 10, wherein the plurality of instructions are further configured to cause the processor to:
    build an object detection model;
    improve the object detection model based on a Single Shot MultiBox Detector (SSD) network, which comprises a backbone network and a first head network.

12. The electronic device as claimed in claim 10, wherein the plurality of instructions are further configured to cause the processor to:
    add a second head network after the backbone network in the SSD network, the object detection model comprising the backbone network, the first head network and the second head network.

13. The electronic device as claimed in claim 12, wherein the plurality of instructions are further configured to cause the processor to:
    obtain training sample images;
    perform a feature extraction on the training sample images by using the backbone network in the object detection model, and obtain training feature maps of different scales of the training sample images;
    generate first default boxes on the training feature maps, perform a convolution operation by inputting the training feature maps into the first head network, output scores of the object categories of the objects in the first default boxes, and output positions of the first default boxes;
    perform a non-maximum suppression operation on the first default boxes, and output a 2D bounding boxes of the objects in the training sample images, the 2D bounding boxes of the objects in the training sample images comprising the object categories in the 2D bounding boxes and the position of the 2D bounding boxes;
    perform a convolution operation by inputting the training feature maps into the second head network, and output the rotation angles of the objects in the training sample images;
    minimize a first loss value of the first head network and a second loss value of the second head network, and obtain the trained object detection model.

14. The electronic device as claimed in claim 12, wherein the plurality of instructions are further configured to cause the processor to:
    perform data enhancement operations on the training sample images.

15. The electronic device as claimed in claim 14, wherein the data enhancement operations comprises flipping images, rotating images, scaling images, or cropping images.

16. The electronic device as claimed in claim 10, wherein the plurality of instructions are further configured to cause the processor to:
    establish a 3D object model library, which comprises a plurality of the object models of different object categories, and the 3D bounding boxes of the object models, each of the 3D bounding boxes comprise length, width and height of one object category of one 3D bounding boxes.

17. The electronic device as claimed in claim 10, wherein the plurality of instructions are further configured to cause the processor to:
    determine the rotation angles of the objects as the rotation angles of the object models;
    determine a direction of the object models in the 3D space according to the rotation angles of the object models;
    determine the positions of the object models in the 3D space according to the direction of the object models in the 3D space, the distance from the camera to the object models, and the 3D bounding boxes.

18. The electronic device as claimed in claim 10, wherein the plurality of instructions are further configured to cause the processor to:
    output the object categories and the positions of the objects in the 3D space;
    display the object categories and the positions of the objects on a display screen.

* * * * *